(12) United States Patent
Kang et al.

(10) Patent No.: US 7,464,641 B2
(45) Date of Patent: Dec. 16, 2008

(54) STACK FASTENING DEVICE

(75) Inventors: Dong Woo Kang, Daejeon (KR); In Gab Jang, Daejeon (KR); Jong Seung Park, Daejeon (KR); Tae Won Lee, Daejeon (KR)

(73) Assignee: Doosan Heavy Industries & Construction Co., Ltd., Gyeongsangnam-Do (KR)

( * ) Notice: Subject to any disclaimer, the term of this patent is extended or adjusted under 35 U.S.C. 154(b) by 0 days.

(21) Appl. No.: 11/966,292

(22) Filed: Dec. 28, 2007

(65) Prior Publication Data
US 2008/0159842 A1    Jul. 3, 2008

(30) Foreign Application Priority Data
Dec. 29, 2006    (KR)    ...................... 10-2006-0137686

(51) Int. Cl.
B30B 15/04    (2006.01)
B30B 15/06    (2006.01)
H01M 2/00    (2006.01)

(52) U.S. Cl. .................. 100/219; 100/99; 100/220; 100/247; 100/269.01; 100/290; 429/34; 429/37

(58) Field of Classification Search .............. 100/3, 100/99, 214, 219, 220, 246, 248, 252, 253, 100/269.01, 290, 295; 429/34, 37, 39; 414/788.1, 414/222.04
See application file for complete search history.

(56) References Cited

U.S. PATENT DOCUMENTS

| 1,239,652 | A | * | 9/1917 | Wickham ................... 100/219 |
| 1,557,881 | A | * | 10/1925 | Rogers ....................... 206/83.5 |
| 4,692,391 | A | * | 9/1987 | Hirota .......................... 429/34 |
| 5,009,968 | A | | 4/1991 | Guthrie et al. |
| 5,347,919 | A | * | 9/1994 | Nordberg ..................... 100/12 |
| 6,413,665 | B1 | | 7/2002 | Blanchet et al. |

FOREIGN PATENT DOCUMENTS

JP    10-261426    9/1998

* cited by examiner

Primary Examiner—Jimmy T Nguyen
(74) Attorney, Agent, or Firm—Lucas & Mercanti, LLP (57) ABSTRACT

A stack fastening device includes a base, on an upper surface of which a stack is loaded, a compression plate, which has a flat configuration and is placed over the stack to press the stack, and a plurality of vertical beams, which are installed on the base to extend vertically so that the upper end portion of the beams projects out through the edge of the compression plate, A thread is formed in an upper end portion of each vertical beam, nuts are threadedly coupled to the thread such that the nuts can be tightened against upper and lower surfaces of the compression plate, and engagement grooves are defined in the upper surface of the compression plate so that a head of a hydraulic cylinder can be coupled to the compression plate.

6 Claims, 8 Drawing Sheets

STACK FASTENING DEVICE

BACKGROUND OF THE INVENTION

1. Field of the Invention

The present invention relates to a stack fastening device for a molten carbonate fuel cell and, more particularly, to a stack fastening device in which a hydraulic unit is detachably installed on a stack fastening section and a load cell and a cooling unit are installed on the lower end of a vertical beam so that compressive force can be applied using a hydraulic cylinder and changes in a stack and in compressive force can be continuously monitored.

2. Description of the Prior Art

As is generally known in the art, a fuel cell serves as an electric power generation device for converting chemical energy, obtained through the oxidation and reduction of a reactant, into electrical energy. In the fuel cell, only water is discharged as a byproduct, unlike other existing kinds of chemical energy. Therefore, since the fuel cell does not cause any environmental pollution, does not generate noise, and features a simple reaction, the fuel cell has been highlighted as a next-generation alternative energy source.

In particular, among fuel cells, a molten carbonate fuel cell (MCFC) has an operating temperature no lower than 600° C., since it uses a molten carbonate as an electrolyte. Thus, the electrochemical reaction can occur rapidly, unlike a fuel cell operating at a low temperature, a catalyst made of a noble metal, such as platinum, is not needed. In the case that electricity and high temperature are simultaneously used, thermal efficiency greater than 80% can be anticipated, and combined cogeneration due to coal gasification is possible.

The unit cell of the molten carbonate fuel cell is composed of an anode and a cathode, at which the electrochemical reaction occurs, a separation plate for defining flow paths for a fuel gas and an oxidant gas, a charge collecting plate for collecting electric charges, an electrolyte and a matrix for accommodating molten carbonate. In the molten carbonate fuel cell, by supplying the fuel gas to the anode and the oxidant gas to the cathode, the electrochemical reaction occurs at the anode and the cathode, by which DC power can be obtained.

The voltage of the unit cell has a low value of about 0.7~1.2V on rated discharge. Hence, for actual generation, a plurality of unit cells is stacked to raise the voltage, and the area of the unit cell is increased to accomplish a high output. The structure in which the plurality of unit cells is stacked is called a stack.

In the stack, since the plurality of unit cells is stacked upon one another, if a gap is formed between unit cells, problems are caused in that internal resistance is generated and the electricity cannot flow smoothly. In order to cope with these problems, in the stack, the contact force between unit cells is increased using a stack fastening device so as to decrease the internal resistance thereof, and compressive force is applied so as to ensure the smooth flow of electricity.

However since in the conventional stack fastening device, a hydraulic cylinder is fixedly installed on a stack, the hydraulic cylinder cannot be used at high temperatures such as 600° C., which is the operating temperature of the stack Also, in the conventional stack fastening device, because the stack is held in a state in which it is simply locked between upper and lower plates after compression force is applied to the stack, the situation in which the height of the stack is changed cannot be flexibly dealt with.

Further, in the conventional stack fastening device, due to the fact that changes in the stack and the compressive force cannot be continuously monitored, it is difficult to adjust the magnitude of the compressive force applied to the stack. As a consequence, in the conventional stack fastening device, because changes in the stack cannot be continuously monitored, in the case where the magnitude of the compressive force applied to the stack is increased, excessive force is applied to the stack and respective unit cells are likely to break. Conversely, in the case where the magnitude of the compressive force is decreased, the contact force between the unit cells becomes insufficient and the smooth flow of electricity cannot be ensured, whereby the voltage cannot be supplied in an adequate manner.

SUMMARY OF THE INVENTION

Accordingly, the present invention has been made keeping in mind the above problems occurring in the prior art, and an object of the present invention is to provide a stack fastening device in which a hydraulic unit for applying compressive force to a stack can be attached to and detached from a stack fastening section so that the compressive force can be applied to the stack using the hydraulic cylinder of the hydraulic unit.

Another object of the present invention is to provide a stack fastening device in which a spring box is installed on a base so that a shock-absorbing function can be provided to absorb the compressive force applied to a stack, whereby it is possible to flexibly deal even with situations in which the height of the stack and/or the compressive force applied to the stack is changed, and the compressive force can be kept constant.

Still another object of the present invention is to provide a stack fastening device in which a load cell and a cooling unit are installed to allow the load applied to each vertical beam to be checked during the operation of a stack so that changes in the stack and compressive force can be continuously monitored even at a high temperature greater than 600° C.

In order to achieve the above object, according to one aspect of the present invention, there is provided a stack fastening device including a base, on an upper surface of which a stack is loaded, a compressive force, which has a flat configuration and is placed over the stack to press the stack, and a plurality of vertical beams, which are installed on the base to extend vertically, so that the upper end portion of the beams projects out through the edge of the compression plate, wherein a thread is formed in an upper end portion of each vertical beam, nuts are threadedly coupled to the thread such that the nuts can be tightened against upper and lower surfaces of the compression plate, and engagement grooves are defined in the upper surface of the compression plate so that the head of a hydraulic cylinder can be coupled to the compression plate.

According to another aspect of the present invention, the stack fastening device further includes a hydraulic plate on which the hydraulic cylinder is installed and connection beams which are defined with vertical beam insertion grooves and are threadedly coupled to threads of the vertical beams, the hydraulic plate is installed above the compression plate by the connection beams, and the head of the hydraulic cylinder is coupled into the engagement grooves of the compression plate by coupling members.

According to another aspect of the present invention, a spring box is mounted to the upper surface of the base on which the stack is placed.

According to another aspect of the present invention, The lower end portion of each vertical beam is installed on and supported by a load cell to measure a load applied to the vertical beam.

According to still another aspect of the present invention, a cooling unit is installed on the lower end portion of the vertical beam above the load cell.

According to a still further aspect of the present invention, the cooling unit has a vertical beam coupling part which is closed at the lower end thereof and in which the lower end portion of the vertical beam is coupled, and a bolt is formed on a body of the cooling unit to be coupled to the load cell.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF A PREFERRED EMBODIMENT

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
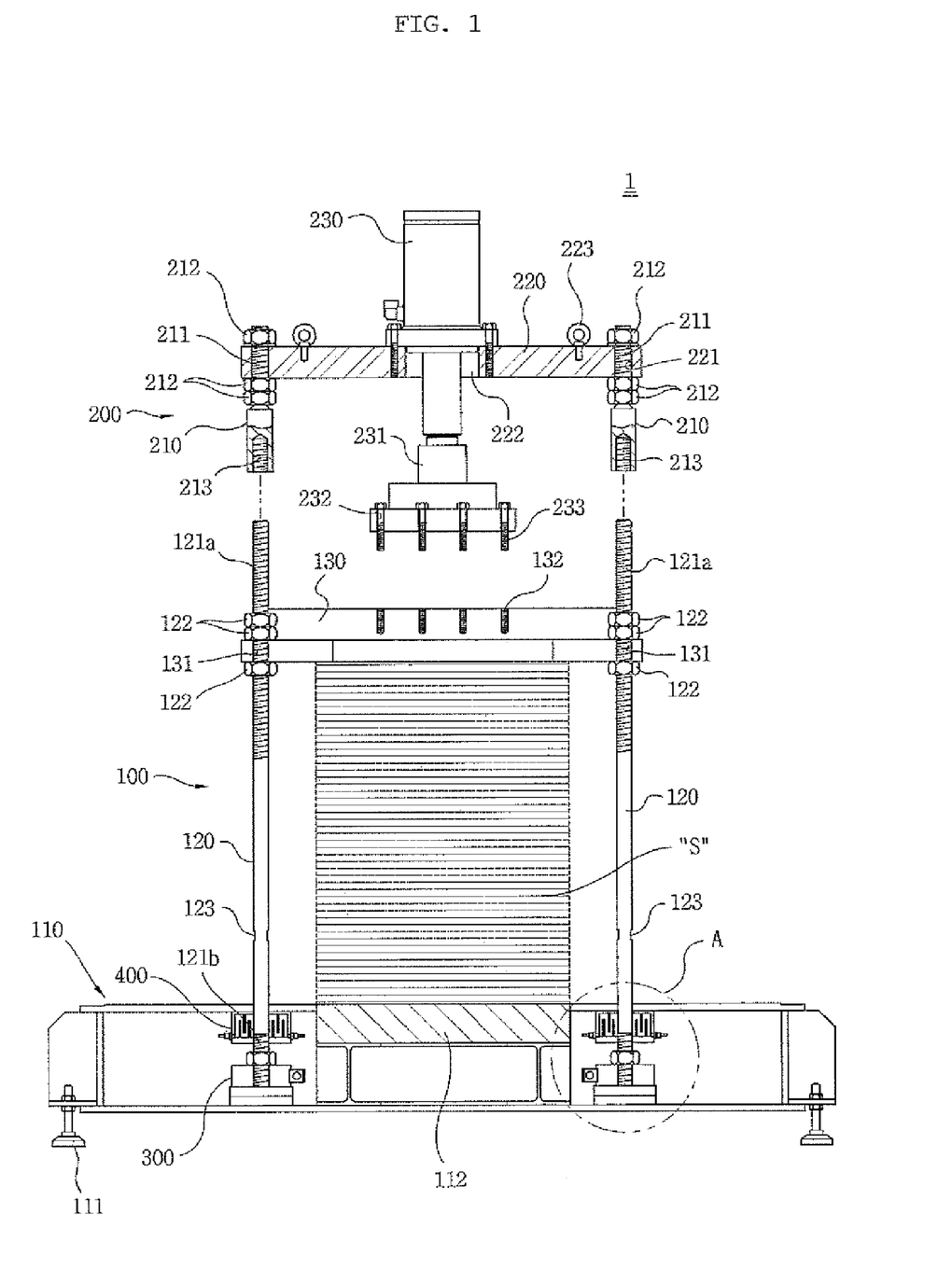
FIG. 1 is a partially exploded sectional view illustrating a stack fastening device in accordance with an embodiment of the present invention.
Figure 2:
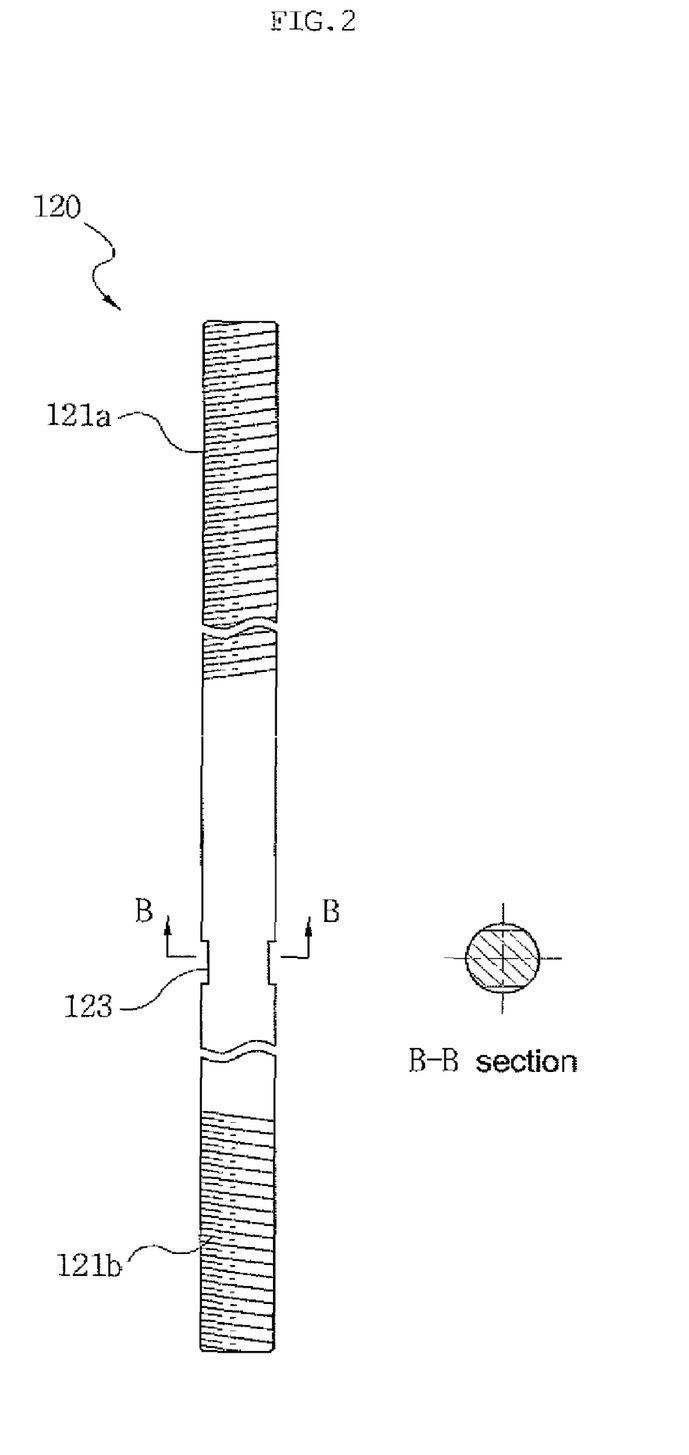
FIG. 2 is a schematic view illustrating a vertical beam according to the present invention.
Figure 3:
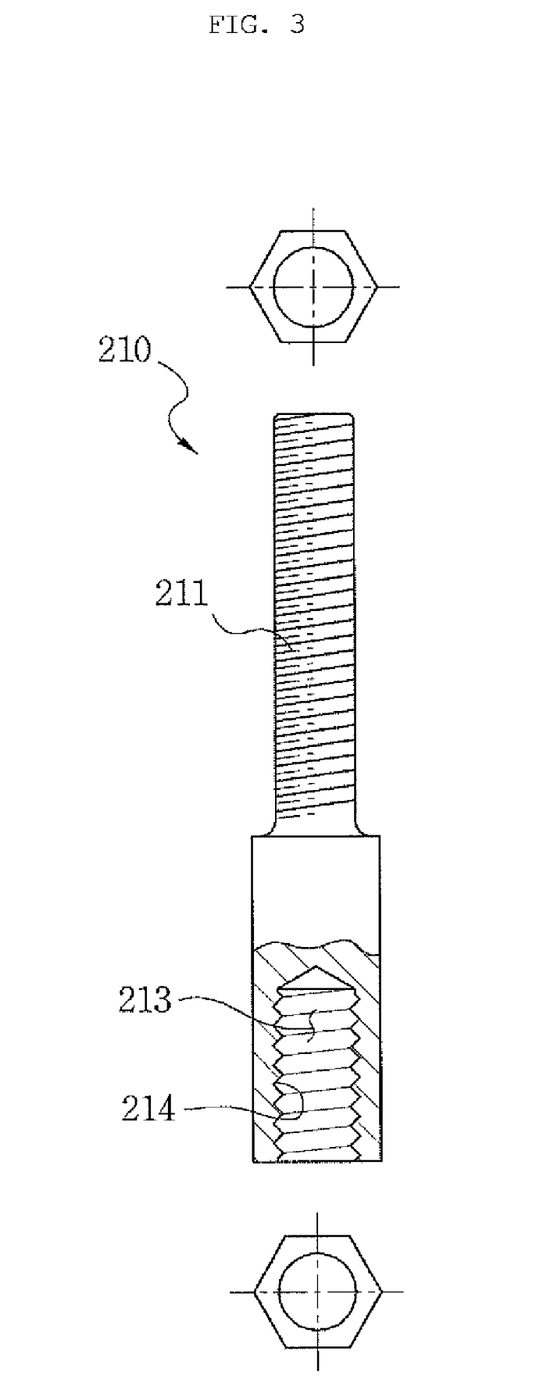
FIG. 3 is a partially broken-away front view of a connection beam according to the present invention.
Figure 4:
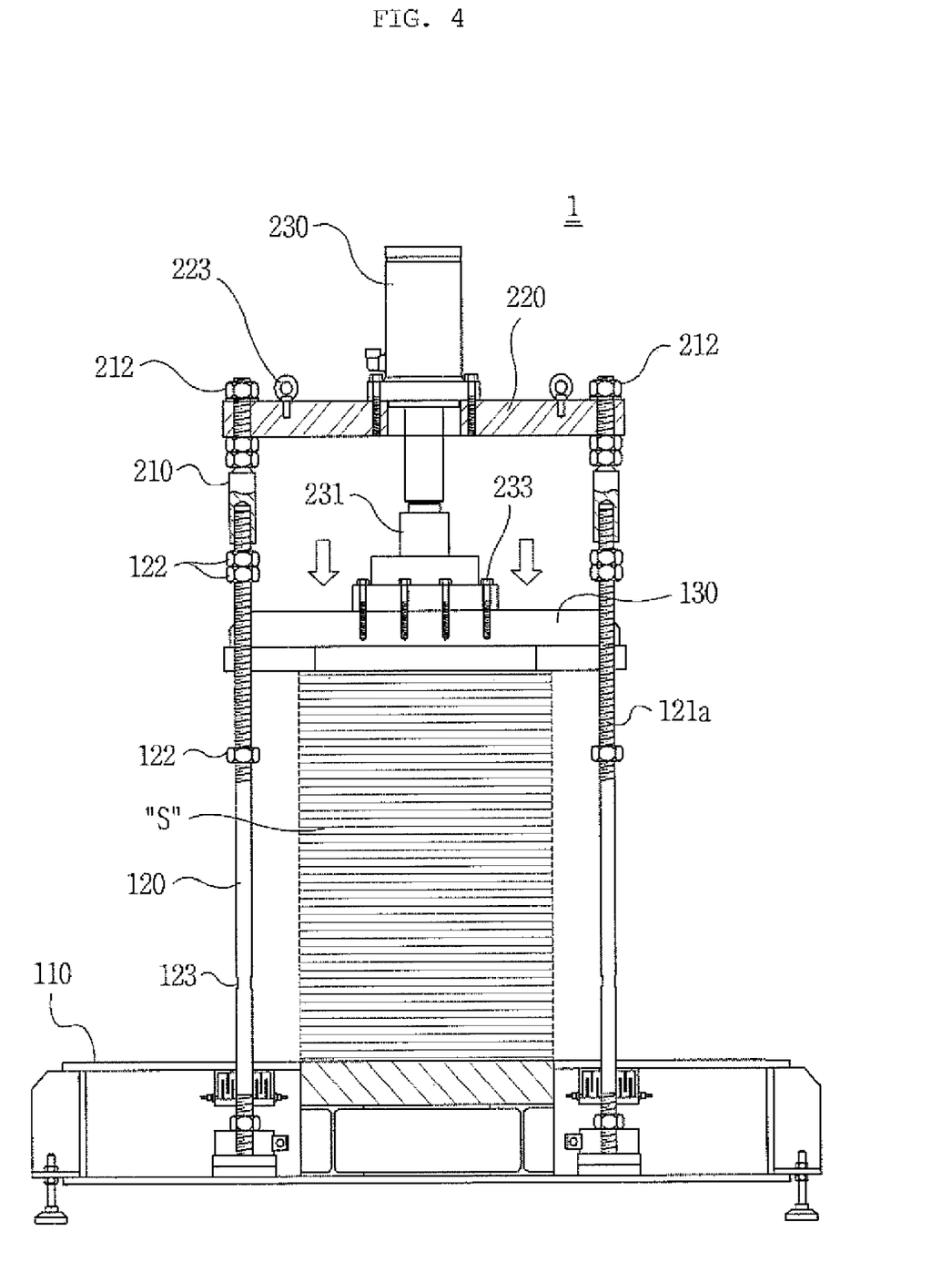
FIG. 4 is a sectional view illustrating a state before the hydraulic unit according to the present invention is operated.
Figure 5:
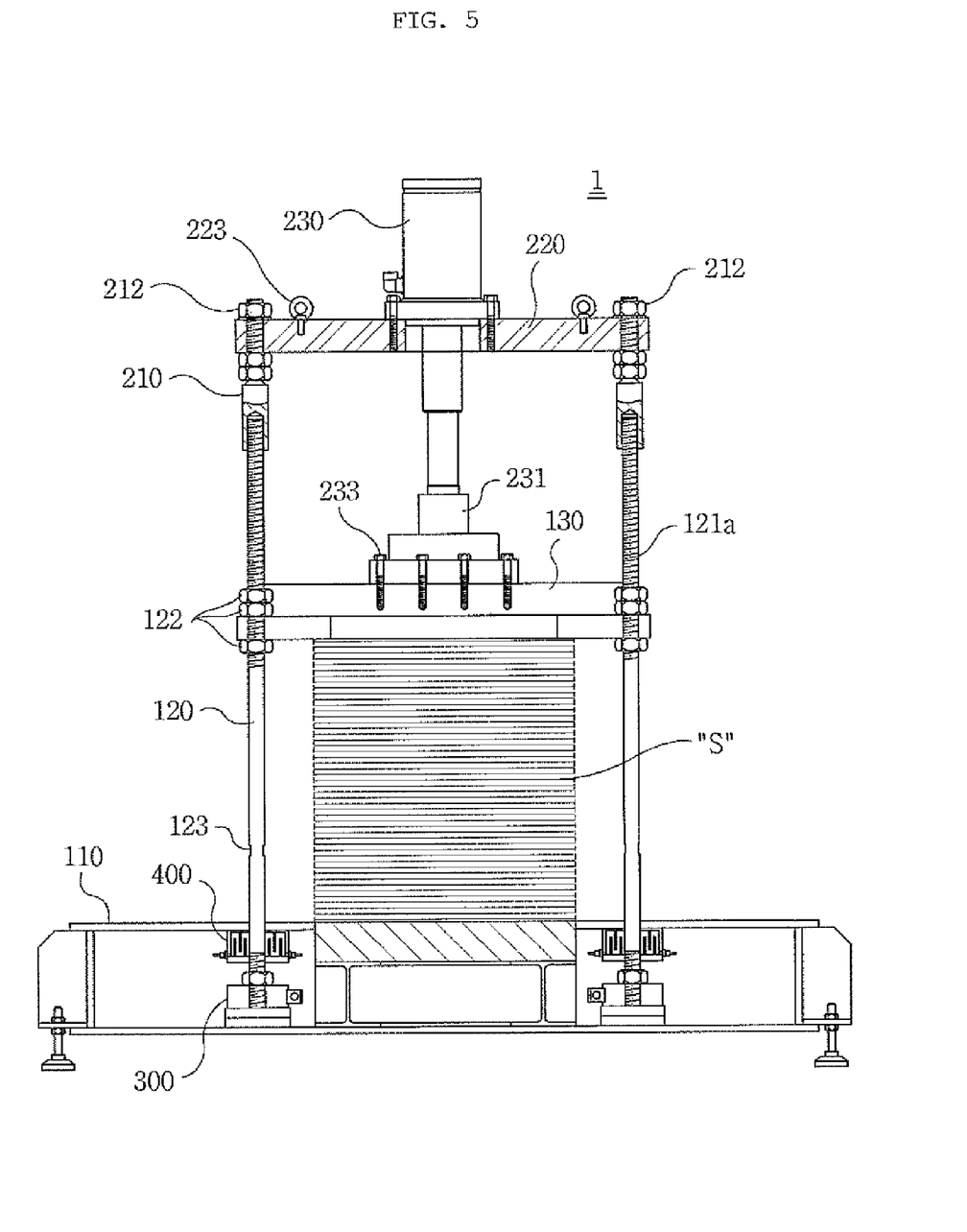
FIG. 5 is a sectional view illustrating a state after the hydraulic unit according to the present invention is operated.
Figure 6:
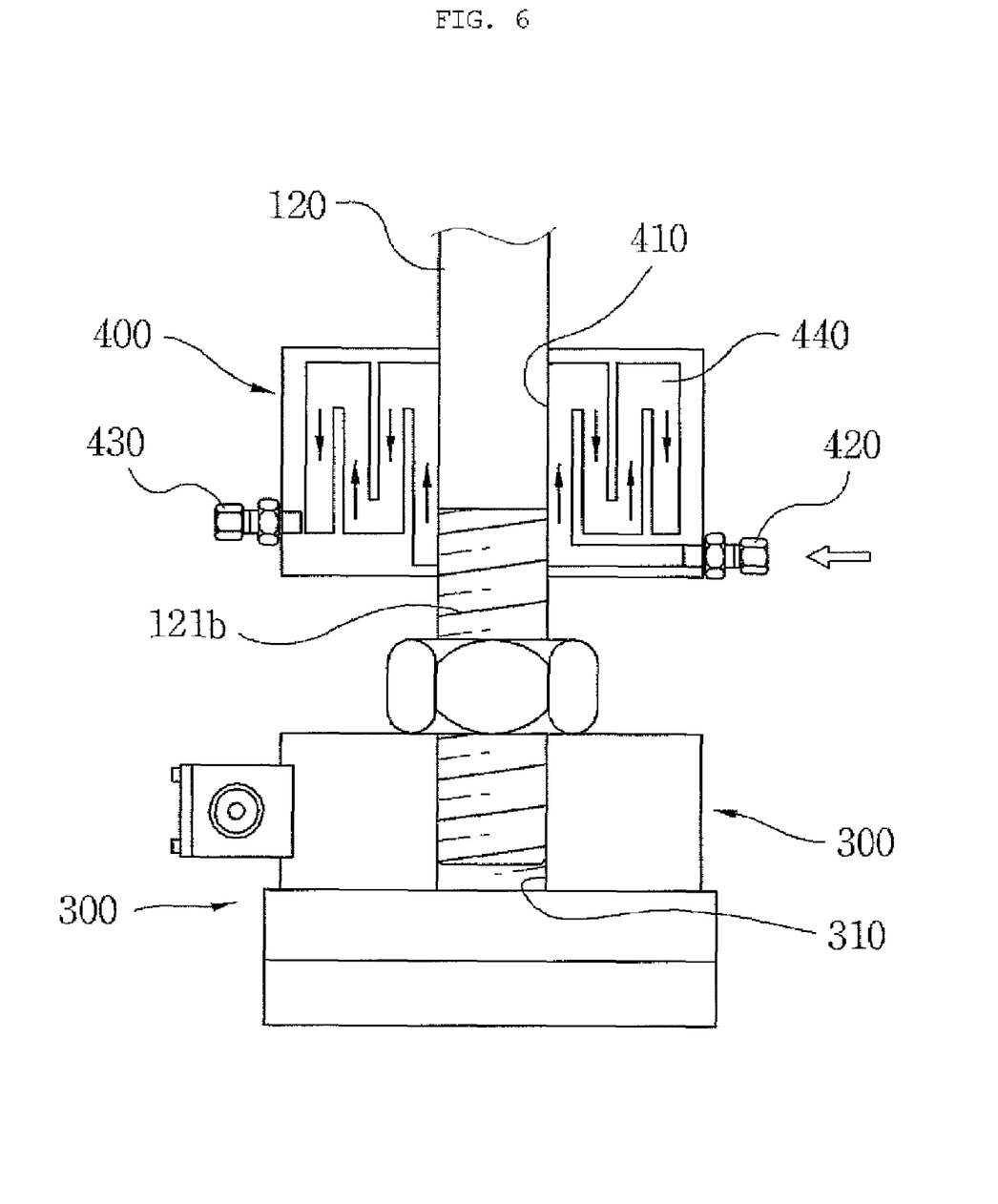
FIG. 6 is an enlarged view of the part 'A' in FIG. 1.
Figure 7:
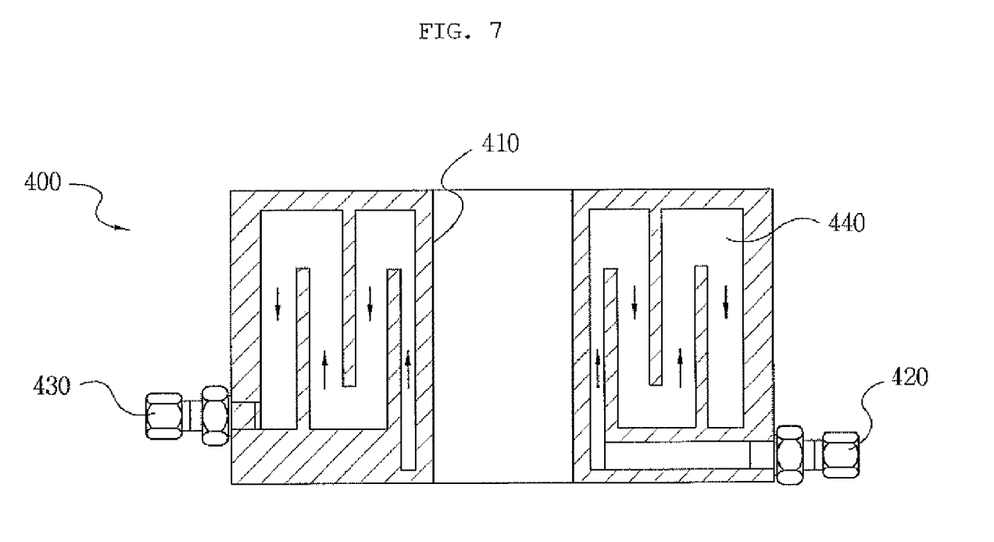
FIG. 7 is a sectional view illustrating a first variation of a flow path defined in a cooling unit according to the present invention.
Figure 8:
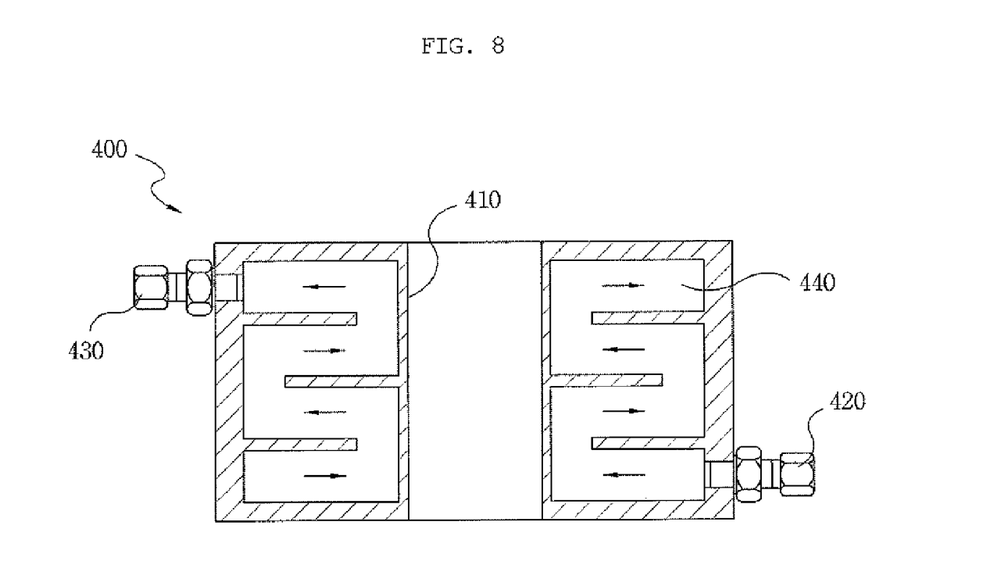
FIG. 8 is a sectional view illustrating a second variation of the flow path defined in the cooling unit according to the present invention.
Figure 9:
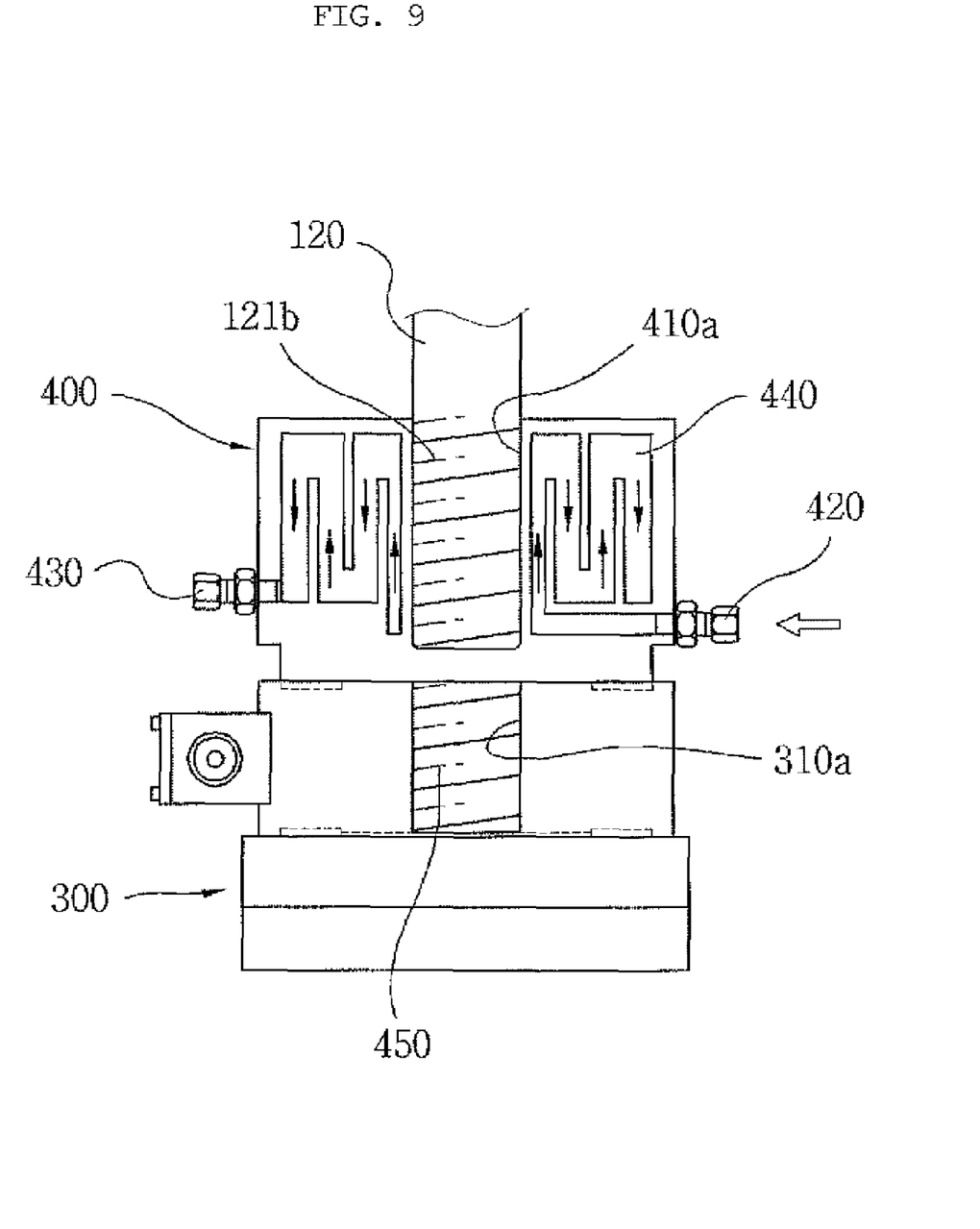
FIG. 9 is a sectional view illustrating another assembly between a cooling unit and a load cell according to the present invention.

FIGS. 1 through 9 illustrate a stack fastening device in accordance with an embodiment of the present invention, wherein FIG. 1 is a partially exploded sectional view of the stack fastening device, FIG. 2 is a schematic view of a vertical beam, FIG. 3 is a partially broken-away front view of a connection beam, FIGS. 4 and 5 are sectional views illustrating states before and after a hydraulic unit according to the present invention is operated, FIG. 6 is an enlarged view of a part of FIG. 1, FIGS. 7 and 8 are sectional views illustrating variations of a flow path defined in a cooling unit, and FIG. 9 is a sectional view illustrating another assembly between a cooling unit and a load cell.

Referring to FIG. 1, the stack fastening device 1 according to the present invention basically includes a stack fastening section 100 in which a stack S is placed, and a hydraulic unit 200 for applying compressive force to the stack fastening section 100.

The stack fastening section 100 serves as an arrangement for placing and fastening the stack S. The stack fastening section 100 includes a base 110 on which the stack S is placed, a plurality of vertical beams 120, which is installed on the base 110, and a compression plate 130, which is installed on the vertical beams 120 such that the upper ends of the vertical beams 120 project out of the compression plate 130.

The base 110 has a cylindrical shape and is formed using material having a substantial weight, such as a metallic material, so as to support the stack S. Four support legs 111 are threadedly coupled to the lower end of the base 110, so that the balance of the base 110 can be adjusted.

A spring box 112 can be additionally installed on the base 110 so that the spring box 112 can be elastically extended out of and retracted into the base 110. The spring box 112 is formed to have a size similar to that of the stack S, and continuously applies compressive force to the stack S. That is to say, the spring box 112 is normally held such that it projects out of the upper surface of the base 110 so that, when the stack S is placed on the spring box 112 and compressive force is applied from the top to the stack S, the spring box 112 can absorb the compressive force applied to the stack S and flexibly deal with the situation even though the height of the stack S is changed. In this way, the spring box 112 can allow constant compressive force to be applied to the stack S irrespective of a change in the height of the stack S.

Referring to FIG. 2, each of the vertical beams 120 is formed in the shape of a rod which has threads 121a and 121b formed in the upper and lower end portions thereof. The vertical beams 120 can be installed in a plural number through the base 110 on which the stack S is placed, such that they are symmetrical with one another. Preferably, four vertical beams 120 are installed. Here, the lower end portions of the vertical beams 120 are threadedly coupled to the inside of the base 110. Nuts 122 are threadedly coupled to the thread 121a which is formed in the upper end portion of each vertical beam 120 in order to fixedly hold the compression plate 130, as will be described below. Two nuts 122 are threadedly coupled to each vertical beam 120 to be positioned at upper and lower positions such that, when the compression plate 130 is installed on the vertical beams 120, the two nuts 122 can be respectively tightened against the upper and lower surfaces of the compression plate 130. As the occasion demands, at least one additional nut can be threadedly coupled to each vertical beam 120 over or under the compression plate 130.

Further, flat portions 123 can be formed on the center part of each vertical beam 120. As shown in the sectional view of FIG. 2, which is taken along the line B-B in the front view of the same figure, the flat portions 123 are formed on the center part of each vertical beam 120 by removing both sides thereof so that the nuts 122 can be easily coupled to the vertical beam 120. Therefore, when installing or uninstalling each vertical beam 120 to or from the base 110, by engaging a tool such as a spanner with the flat portions 123, the nuts 122 can be easily coupled to and uncoupled from the vertical beam 120.

The compression plate 130 has the shape of quadrangular plate and is installed on the vertical beams 120 to be positioned over the stack S. In detail, the compression plate 130 is defined with vertical beam installation holes 131 at four regions corresponding to the vertical beams 120, and the vertical beams 120 are installed through the vertical beam installation holes 131 such that the upper ends of the vertical beams 120 project out of the compression plate 130. At this time, the compression plate 130 is held parallel to the stack S and is installed in such a way as to be supported by the nuts 122, which are threadedly coupled to the vertical beams 120 as described above. Engagement grooves 132 are defined in the center portion of the compression plate 130 to allow the head 231 of a hydraulic cylinder 230, which will be described later, to be coupled to the compression plate 130.

The hydraulic unit 200 for applying compressive force to the stack S via the compression plate 130 is installed on the stack fastening section 100 structured as described above and the hydraulic unit 200 can be attached and detached from a stack fastening section 100. The hydraulic unit 200 includes connection beams 210, which are coupled to the upper ends of the vertical beams 120, a hydraulic plate 220, which is installed on the connection beams 210, and the hydraulic cylinder 230, which is installed on the hydraulic plate 220 and is detachably coupled to the compression plate 130 at the lower end thereof.

Referring to FIG. 3, each connection beam 210 is formed in the shape of a rod which is formed with a thread 211 in the upper portion thereof and has a vertical beam insertion groove 213 defined in the lower portion thereof. Each connection beam 210 is installed to be aligned with each vertical beam 120. In detail, the upper portion of each connection beam 210 has a diameter similar to that of the vertical beam 120, and the lower portion of each connection beam 210 is enlarged in the diameter thereof so that it is greater than the diameter of the vertical beam 120, so that the vertical beam 120 can be inserted into the lower portion of the connection beam 210. Nuts 212 are threadedly coupled to the thread 211, which is formed in the upper portion of each connection beam 210 in order to fixedly hold the hydraulic plate 220, as will be described below. Two nuts 212 are threadedly coupled to each connection beam 210 such that, when the hydraulic plate 220 is installed on the connection beams 210, the two nuts 212 can be respectively tightened on the upper and lower surfaces of the hydraulic plate 220. An internal thread 214 is formed on the inner surface of the vertical beam insertion groove 213 such that the thread 121a formed in the upper end portion of the vertical beam 120 can be threadedly coupled to the internal thread 214 of the connection beam 210.

The hydraulic plate 220 has connection beam installation holes 221 defined in four regions corresponding to the connection beams 210, and is installed on the connection beams 210 using the nuts 212, as described above. A cylinder installation hole 222 is additionally defined through the center portion of the hydraulic plate 220 such that the hydraulic cylinder 230 can be installed in the cylinder installation hole 222, as will be described below. Further, eye bolts 223 are driven into both side of upper portions of the hydraulic plate 220 so that the hydraulic plate 220 and the hydraulic cylinder 230 can be lifted using a crane.

The hydraulic cylinder 230 is detachably coupled to the compression plate 130 to apply compressive force to the stack S, and is mounted to the center portion of the hydraulic plate 220. The head 231 is formed on the lower end of the hydraulic cylinder 230 and is detachably coupled to the compression plate 130. To accomplish this, compression plate engagement grooves 232 are defined adjacent to the edge of the head 231 and are aligned with the engagement grooves 132 defined in the compression plate 130 such that the head 231 and the compression plate 130 can be coupled to each other by coupling members 233 engaged in the compression plate engagement grooves 232 and the engagement grooves 132. It is preferred that the coupling members 233 be partially threaded members.

FIGS. 4 and 5 illustrate the operational states of the hydraulic unit 200. FIG. 4 illustrates the state in which compressive force is applied to the stack S. At this time, the nuts 122 are threadedly coupled to each vertical beam 120 in such a way as to be sufficiently separated from the compression plate 130 so that the compression plate 130 can be moved a substantial distance toward the stack S (in the direction indicated by the arrows) when the compressive force is applied to the stack S.

In a state in which the stack S is compressed as a result of application of the compressive force to the stack S for a predetermined time, as shown in FIG. 5, the nuts 122 are tightened against the upper and lower surfaces of the compression plate 130 and thereby fixedly hold the pressure plate 130.

When the operation of the stack fastening device 1 according to the present invention is completed as described above, the hydraulic unit 200 is removed from the stack fastening section 100. First, in the hydraulic unit 200, the plurality of coupling members 233 and the nuts 212, tightened against the upper surface of the hydraulic plate 220, are removed. Thereafter, the hydraulic plate 220, the hydraulic cylinder 230 and the head 231 of the hydraulic unit 200 are removed by connecting equipment such as a crane to the eye bolts 223. Thereupon, by removing the four connection beams 210 coupled to the vertical beams 120, the removal of the hydraulic unit 200 is completed.

Load cells 300 and cooling units 400 can be additionally installed on the stack fastening device 1 according to the present invention.

Referring to FIG. 6, a load cell 300 is installed on the lower end portion of the vertical beam 120, which is positioned inside the base 110 to measure changes in the load applied to the stack S. The load cell 300 is formed at the center region thereof with a vertical beam coupling part 310 which is threadedly coupled with the thread 121b formed in the lower end portion of the vertical beam 120. The load cell 300 can indicate the load applied to the vertical beam 120 during the operation of the stack S, by which it is possible to continuously monitor changes in the stack S and the compressive force.

Each cooling unit 400 is installed on the lower end portion of the vertical beam 120 above the load cell 300 to reduce the surrounding temperature to a predetermined one. Similar to the load cell 300, the cooling unit 400 has formed in the center region thereof a vertical beam coupling part 410 which is threadedly coupled with the thread 121b formed in the lower end portion of the vertical beam 120. The cooling unit 400 is then completely attached to the vertical beam 120 through welding. Since the load cell 300 cannot operate at a temperature greater than 600° C., which is the operating temperature of the stack S, the cooling unit 400 is installed to reduce the temperature around the load cell 300 and the temperature of the lower end portion of the vertical beam 120.

As shown in FIG. 6, an inlet pipe 420 and an outlet pipe 430 are respectively formed on both sides of the cooling unit 400 so that cooling water (not shown) can be introduced into and discharged out of the cooling unit 400 through the inlet pipe 420 and the outlet pipe 430. A flow path 440, which communicates the inlet pipe 420 and the outlet pipe 430 with each other, is formed in the body of the cooling unit 400. Cooling water decreases the temperature of the vertical beam 120 and the surrounding temperature while it is introduced through the inlet pipe 420, flows through the flow path 440, which is defined in a zigzag pattern, and is discharged through the outlet pipe 430. This flow path 440 can be defined in a variety of ways.

Referring to FIGS. 7 and 8, the flow path 440 can be defined in a manner such that it extends from the inside toward the outside of the cooling unit 400 or from the lower end toward the upper end of the cooling unit 400. Preferably, as shown in FIG. 6, the flow path 440 is defined such that cooling water can come into direct contact with the vertical beam 120. If the flow path 440 is defined in this way to come into direct contact with the vertical beam 120, cooling efficiency can be improved.

FIG. 9 illustrates another assembly between a cooling unit 400 and a load cell 300. Referring to FIG. 9, a vertical beam coupling part 410a, which is closed at the lower end thereof, is formed in the center region of the cooling unit 400, and a bolt 450 extends from the lower end of the body of the cooling unit 400 and is coupled to the load cell 300. A bolt coupling part 310a is formed in the center region of the load cell 300 to correspond to the bolt 450 such the cooling unit 400 and the load cell 300 can be directly coupled to each other. In this way, because the cooling unit 400 and the load cell 300 are directly coupled to each other, the cooling unit 400 can be installed without the need to perform a welding process.

As is apparent from the above description, the stack fastening device according to the present invention provides advantages in that a hydraulic unit for applying compressive force to a stack can be attached to and detached from a stack fastening section, so that the compressive force can be applied to the stack using the hydraulic cylinder of the hydraulic unit. Also, since a spring box is installed on a base so that a shock-absorbing function can be provided to absorb the compressive force applied to the stack, it is possible to flexibly deal even with a situation in which the height of the stack and/or the compressive force applied to the stack is changed, and the compressive force can be kept constant.

Also, in the stack fastening device according to the present invention, because a load cell and a cooling unit are installed to allow the load applied to each vertical beam to be checked during the operation of the stack, changes in the stack and the compressive force can be continuously monitored even at temperatures greater than 600° C.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. The wording, "including a base on an upper surface of which a stack is loaded, a compression plate which has a flat configuration and is placed over the stack to press the stack, and a plurality of vertical beams which are installed on the base to extend vertically, so that the upper end portion of the beams projects out through the edge of the compression plate, wherein a thread is formed on an upper end portion of each vertical beam, nuts are threadedly coupled to the thread such that the nuts can be tightened against upper and lower surfaces of the compression plate, and engagement grooves are defined on the upper surface of the compression plate so that a head of a hydraulic cylinder can be coupled to the compression plate" have been deleted and replaced with the following paragraphs:

comprising:
a detachable hydraulic unit;
a base having an upper surface on which a stack is loaded;
a compression plate which has a flat configuration and is placed over the stack to press the stack;
a plurality of vertical beams which are installed on the base to extend vertically, wherein an upper end portion of each of the beams projects out through the edge of the compression plate, a thread is formed on the upper end portion of each of the vertical beams, the thread of each of the vertical beams is configured to receive the detachable hydraulic unit, a plurality of nuts are threadedly coupled to the thread of each of the vertical beams, some of the nuts of each of the vertical beams are positioned above the compression plate and the other of the nuts of each of the vertical beams is positioned below the compression plate such that the nuts can be tightened against upper and lower surfaces of the compression plate, and
a plurality of engagement grooves which are formed on the upper surface of the compression plate, said engagement grooves are configured to receive a plurality of coupling members of a head of a hydraulic cylinder of the detachable hydraulic unit.

2. The stack fastening device according to claim 1, wherein the detachable hydraulic unit comprises a hydraulic plate on which the hydraulic cylinder is installed and connection beams which have vertical beam insertion grooves defined therein and are detachably threadedly coupled to the threads of the vertical beams, wherein the hydraulic plate is detachably installed above the compression plate by the connection beams, and the head of the hydraulic cylinder is coupled into the engagement grooves of the compression plate by the coupling members.

3. The stack fastening device according to claim 1, wherein a spring box is mounted to the upper surface of the base, on which the stack is placed.

4. The stack fastening device according to claim 1, wherein the lower end portion of each vertical beam is installed on and supported by a load cell to measure a load applied to the vertical beam.

5. The stack fastening device according to claim 4, wherein a cooling unit is installed on the lower end portion of the vertical beam above the load cell.

6. The stack fastening device according to claim 5, wherein the cooling unit has a vertical beam coupling part, which is closed at a lower end thereof, and in which the lower end portion of the vertical beam is coupled, and a bolt is formed on a body of the cooling unit to be coupled to the load cell.

* * * * *